United States Patent
Wong et al.

[19]

[11] Patent Number: 6,131,323
[45] Date of Patent: Oct. 17, 2000

[54] DISPLAY MOUNTING DEVICE

[75] Inventors: Kon Wong, Knoxfield; Peter K. Bayly, Euroa; Stuart Eason, East Hawthorn; Andrew Eason, Somerville, all of Australia

[73] Assignee: Norwood Industries Pty. Ltd., Knoxfield, Australia

[21] Appl. No.: 09/212,443

[22] Filed: Dec. 16, 1998

[30] Foreign Application Priority Data

Dec. 24, 1997 [AU] Australia ................... PP1150

[51] Int. Cl.⁷ ............... B65C 3/08; A01G 9/02
[52] U.S. Cl. .................. 40/645; 47/70
[58] Field of Search ............. 40/645, 312, 324; 47/70

[56] References Cited

U.S. PATENT DOCUMENTS

| | | |
|---|---|---|
| 2,760,287 | 8/1956 | Fekula . |
| 3,176,969 | 4/1965 | Glynn . |
| 3,493,990 | 2/1970 | Winn . |
| 4,027,410 | 6/1977 | Wheeler . |
| 4,516,687 | 5/1985 | Taguchi et al. . |
| 4,631,861 | 12/1986 | Wuthrich . |
| 4,658,540 | 4/1987 | Hougard . |
| 4,744,171 | 5/1988 | Hilliard . |
| 4,978,005 | 12/1990 | Sammet . |

FOREIGN PATENT DOCUMENTS

| | | |
|---|---|---|
| B-52911/90 | 10/1990 | Australia . |
| B-55231/94 | 8/1994 | Australia . |

*Primary Examiner*—Cassandra H. Davis
*Attorney, Agent, or Firm*—Oliff & Berridge, PLC

[57] ABSTRACT

A display mounting device for holding a display object has a mounting region with at least one mounting edge. The display mounting device also has an opening, into which the mounting region may be inserted; a resilient placement member, which bends to allow enlargement of the opening as the mounting region is inserted into the opening, and returns to or towards its normal orientation when the mounting region has been fully inserted, thereby assisting in holding the display object in position; at least one stabilising member to assist in holding the display object in position; and at least one retaining member, co-operating with the mounting edge to inhibit withdrawal of the mounting region from the opening, thereby assisting in holding the display object in position

13 Claims, 3 Drawing Sheets

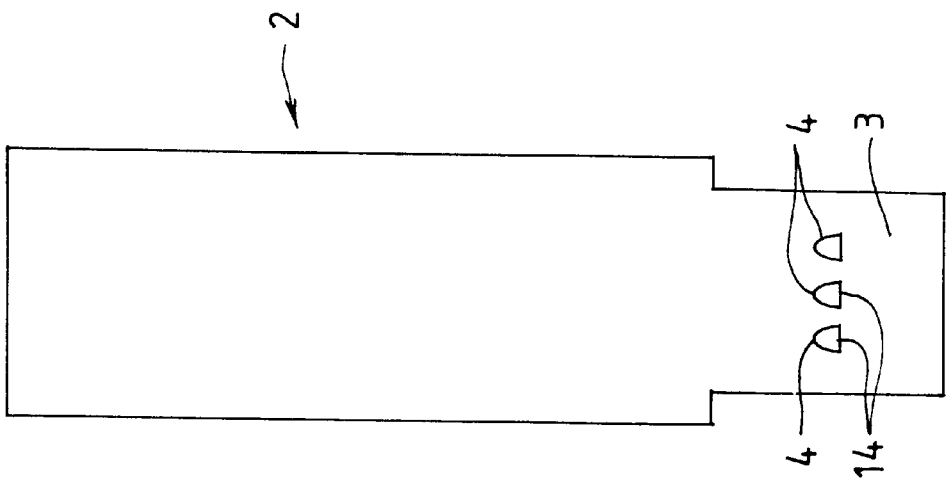
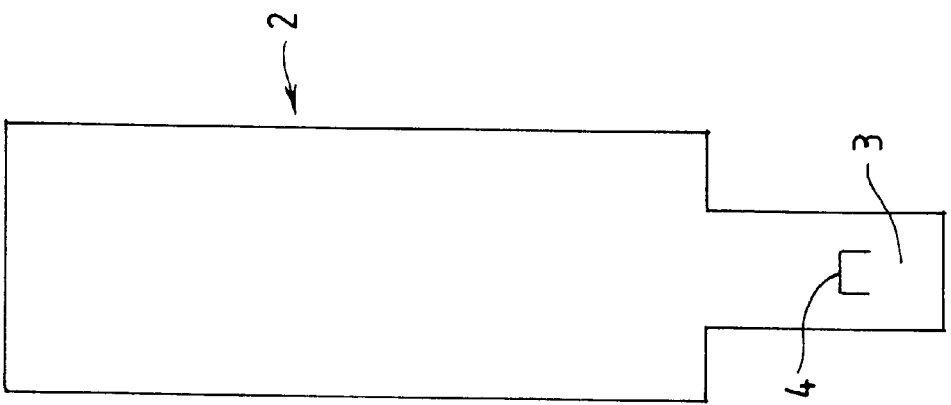
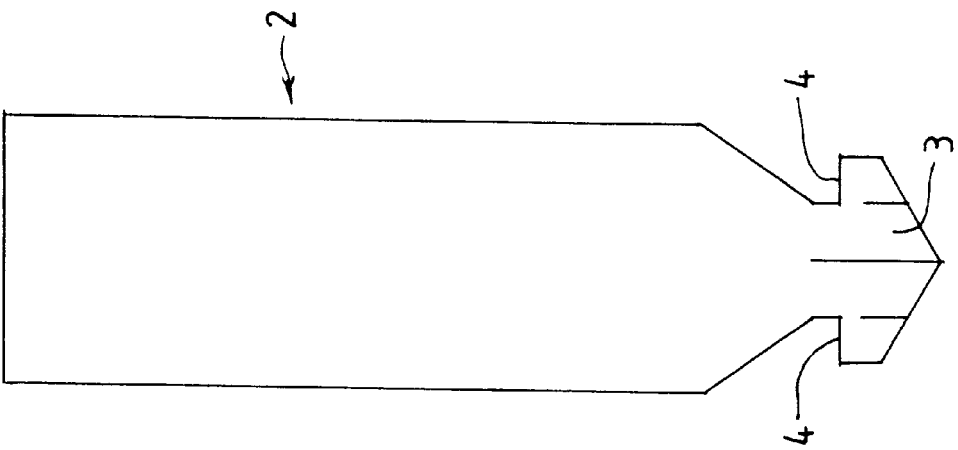

DISPLAY MOUNTING DEVICE

The invention relates to a display mounting device. It relates particularly but not exclusively to a device such as a mounting device on a plant container for securely holding a display object such as a plant label so that the display object is not easily removed by wind or other commonly encountered forces. The invention will be described with particular reference to plant labels and plant containers, but it is to be understood that the invention is applicable to many other types of display objects and many other types of items on which those display objects are to be mounted.

Plants, which are typically sold in plant pots or smaller containers such as punnets, need to be labelled so that prospective purchasers are aware of the plant variety and other relevant details. Labels can be tied onto the plants, but this a labour-intensive process, particularly in a large wholesale nursery, and ties are unsuitable for some plants such as small seedling. Labels can be pressed into the soil beside the plants; however, such labels are often easily blown away by the wind, or easily swapped so that some plants are incorrectly labelled.

Australian patent 674905 in the name of Flower Capet Pty Ltd describes a display stake for potted plants. The plastic display stake described has a lower mounting portion, which clips on to the rim of a plant pot, and an upper label receiving portion, onto which the plant label is placed. The stake is suitable when the rim of the plant pot is shaped appropriately, and the plant is a reasonably large one, so that the plant stake elevates the height of the label to catch the eye of the prospective purchaser. However, it is not in general suitable for small plant containers such as punnets, in which plant stakes look out of place, and which do not incorporate appropriately shaped rims.

Australian Patent 616346 in the name of the present applicant describes a label mounting device having a control zone formed between two substantially parallel walls, with stop means extending from one wall towards the other and allowing the head of a label to be inserted into the control zone, but restricting withdrawal. Devices of the type described operate quite successfully. They allow labels to be clipped into mounting devices very quickly, thereby significantly reducing the amount of time involved in applying labels to plants, while at the same time holding the labels securely, preventing accidental removal by the wind or other forces. However, precision tooling is required to produce properly functioning mounting devices. Pots and punnets bearing mounting devices are usually formed by injection moulding because it is difficult to construct a suitable mounting device using thermo formed plastics technology.

An object of the present invention is to provide a new type of mounting device.

According to a first aspect of the present invention, there is provided a display mounting device for holding a display object which has a mounting region with at least one mounting edge, the display mounting device having:

an opening, into which the mounting region may be inserted;

a resilient placement member, which bends to allow enlargement of the opening as the mounting region is inserted into the opening, and return to or towards its normal orientation when the mounting region has been fully inserted, thereby assisting in holding the display object in position;

at least one stabilising member to assist in holding the display object in position; and at least one retaining member, co-operating with the mounting edge to inhibit withdrawal of the mounting region from the opening, thereby assisting in holding the display object in position.

The opening may be of any suitable shape and configuration. In a preferred arrangement, the opening is substantially in the shape of a slit. In a further preferred arrangement, the opening includes a portion wide enough to accommodate the thickness of the mounting region, and a narrower portion which is not normally wide enough to accommodate the thickness of the mounting region.

The resilient placement member may be of any suitable shape and configuration. It is preferred that the resilient placement member be oriented substantially perpendicular to the direction of insertion of the mounting region into the opening. It is further preferred that the resilient placement member bends in the direction of insertion during insertion of the mounting region into the opening, and after the insertion has been completed it returns to an orientation substantially perpendicular to the mounting region. In an especially preferred arrangement, the resilient placement member comprises a substantially flat membrane held in place by substantially rigid supports, with an edge of the membrane forming one side of the opening.

The stabilising member may be of any suitable shape and configuration. In one preferred arrangement, the opening has a linear central section which has a length which matches the width of the mounting region when in its inserted position, and non-linear side portion which accommodate the greater width of portions of the mounting region as the mounting region is being inserted. In this arrangement, the edges between the opening's central linear section and the side portions may constitute stabilising members. In other arrangements, stabilising members may be formations which help to hold the mounting region in place.

The retaining member may be of any suitable shape and configuration. It is preferred that the retaining member include or consist of one or more stops behind which the mounting edge locates to prevent withdrawal of the mounting region from the opening.

It is preferred that the display mounting device further include stabilising formations to hold the display object in a stable manner.

According to another aspect of the invention, there is provided a display object in combination with a display mounting device, the display object having:

a display region;

a mounting region; and at least one mounting edge in the mounting region;

and the display mounting device having:

an opening, into which the mounting region may be inserted;

a resilient placement member, which bends to allow enlargement of the opening as the mounting region is inserted into the opening, and returns to or towards its normal orientation when the mounting region has been fully inserted, thereby assisting in holding the display object in position;

at least one stabilising member to assist in holding the display object in position; and at least one retaining member, co-operating with the mounting edge to inhibit withdrawal of the mounting region from the opening, thereby assisting in holding the display object in position.

The display object may be any suitable display object. The display object may be a label, a packet of seeds, a packet of fertiliser, a sample packet, a combination of these, or any other suitable object.

Built in or attached to the display object is the mounting region, which may have any suitable shape and configuration. One suitable shape is an arrow-head shape. Another suitable shape is a tab with a central hole or cut in it.

The mounting edge may be of any suitable shape and configuration. It may be a straight edge which is substantially parallel with the opening when the mounting region has been inserted. It may be in the shape of a curve, a V-shape, or any other suitable shape.

Optional and preferred features of the display mounting device may be as described above with reference to the first aspect of the invention.

The invention will hereinafter be described in greater detail with reference to the attached drawings which shown an example form of the invention. It is to be understood that the particularity of those drawings does not supersede the generality of the preceding description of the invention.

FIG. 4 is a schematic representation of a display object suitable for use in the invention.

FIG. 5a and 5b show display objects suitable for use in the invention, with differing mounting region characteristics.

Figure 1:
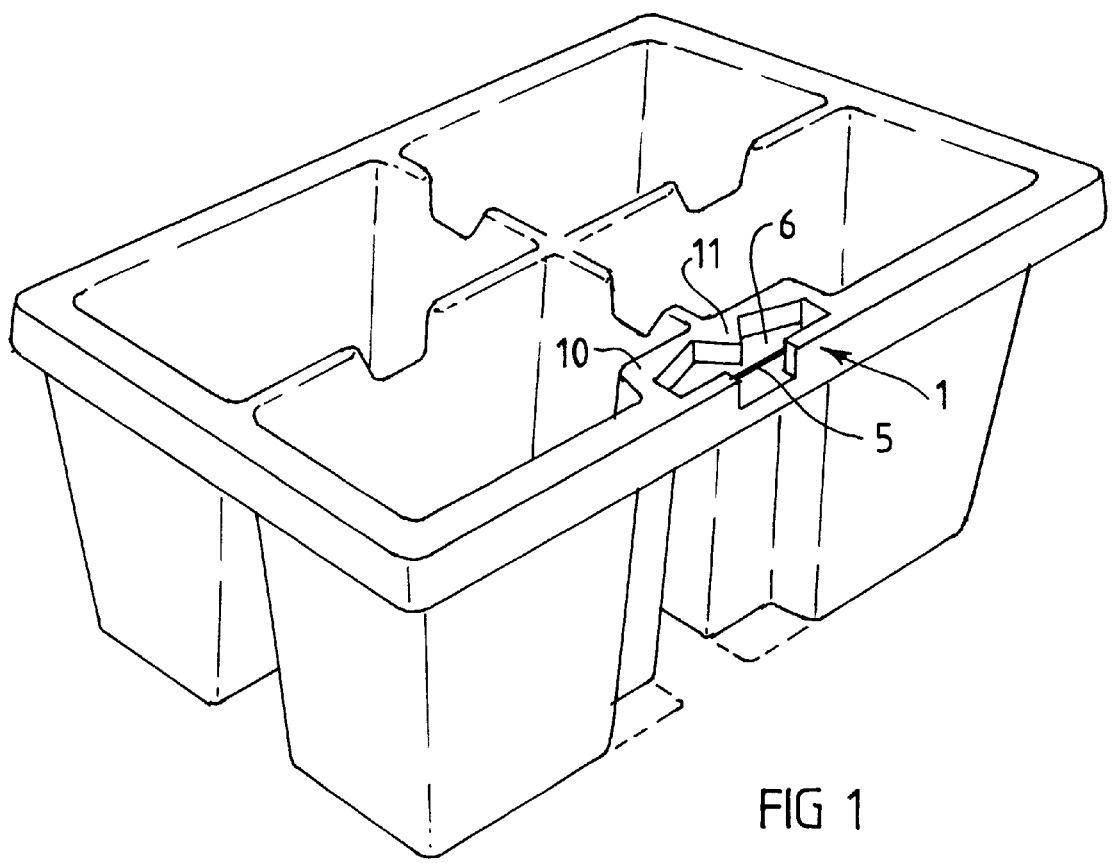
FIG. 1 is a perspective view of a plant container incorporating a display mounting device according to an embodiment of the invention.
Figure 2:
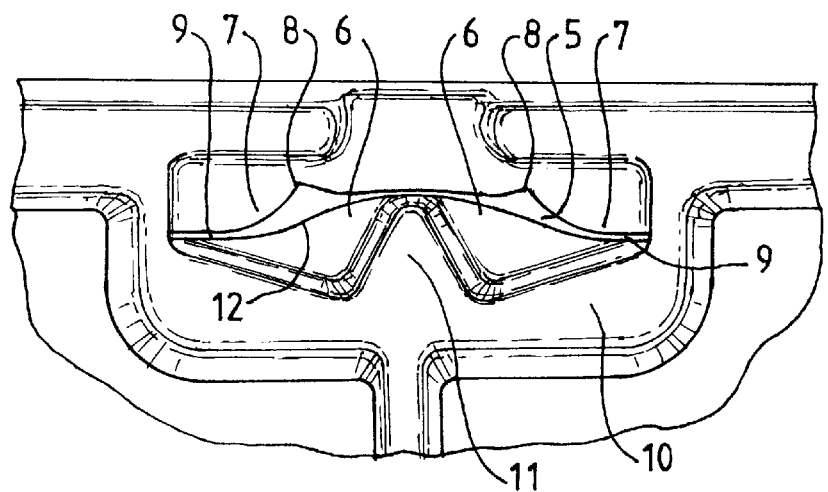
FIG. 2 is a top perspective view of a mounting device according to an embodiment of the invention.
Figure 3:
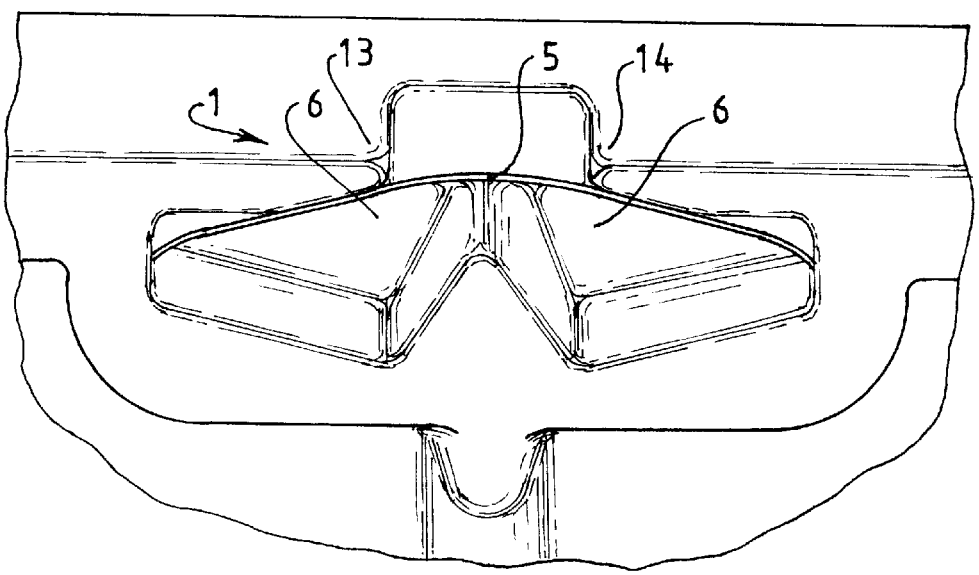
FIG. 3 is a further perspective view of the mounting device of FIG. 2.

Referring firstly to FIGS. 1 to 3, display mounting device 1 is for holding a display object 2 which has a mounting region 3 with at least one mounting edge 4. Display mounting device 1 has an opening 5, into which mounting region 3 may be inserted. Resilient placement member 6, bends to allow enlargement of opening 5 as mounting region 3 is inserted into opening 5, and returns to or towards its normal orientation when mounting region 3 has been fully inserted, thereby assisting in holding display object 2 in position.

In the embodiments illustrated, there are two retaining members 7, shown in FIG. 2, co-operating with two mounting edges 4(shown in FIG. 4) to inhibit withdrawal of mounting region 3 from opening 5, thereby assisting in holding the display object in position.

Opening 5 is substantially in the shape of a slit. Opening 5 includes central linear portion 8 which has a length sufficient to accommodate the width of mounting region 3 when it is in its fully inserted position, and non-linear angled side portions 9 which open to accommodate the additional width of mounting region 3 during insertion. This assists in retaining mounting region 3 in place, as it cannot be removed without opening non-linear portion 9 of opening 5. Non-linear portions 9 must be stretched in order to admit mounting region 3 through opening 5 during insertion, but they are designed such that insertion is relatively easy, but removal is relatively difficult.

The edges between central linear portion 8 and non-linear portion 9 thus constitute stabilising members, as do stabilising formation 11, 13 and 14.

In the embodiment illustrated, resilient placement member 6 is oriented substantially perpendicular to the direction in which mounting region 3 is inserted into opening 5. However, there is no essential reason why the orientation must be perpendicular; it will be appreciated that the invention is of equal utility if the resilient placement member is angled downwardly or at some other suitable angle or angles. During the insertion process, resilient placement member 6 bends in the direction of insertion (i.e. downwards) and after the insertion has been completed it returns to an orientation substantially perpendicular to mounting region 3 (i.e. substantially horizontal in this particular embodiment). In the embodiment illustrated, resilient placement member 6 comprises a substantially flat membrane held in place by substantially rigid supports 10 and 11, with an edge 12 of the membrane forming one side of opening 5.

Retaining members 7 consist of stops behind which mounting edges 4 locate to present withdrawal of mounting region 3 from opening 5.

Display mounting device 1 in the embodiment illustrated further includes stabilising formation 11, 13, 14 to hold display object 2 in a stable manner. When mounting region 3 has been fully inserted, display mounting device 1 holds display object 2 in a secure position leaning against stabilising formation 11.

Retaining members 7 and stabilising formation 11 also act as ramps to guide the mounting region as the mounting region is inserted into opening 5. This makes it relatively easy for a person to insert the mounting region quickly and accurately.

Referring now to FIGS. 4, 5a and 5b, various configurations for display object 2 are shown. Display object 2 may be a label, seed packet, sample packet, fertiliser packet, or any other such object.

Built in or attached to display object 2 is mounting region 3. One suitable shape for mounting region 3 is an arrowhead shape, as shown in FIG. 4. This shape is especially designed to co-operate with the mounting device illustrated in FIGS. 1 to 3.

Other suitable shapes for mounting region 3 are shown in FIGS. 5a and 5b. In the embodiment of FIG. a, mounting region 3 is a tab with a centrally located cut in it, forming a section which bends out from the plane of mounting region 3 to form mounting edge 4. In the embodiment of FIG. b, mounting region 3 is a tab which has holes 14. Parts of the holes form mounting edges 4. It will be appreciated that, for these embodiments, the shape of mounting device 1 and its component parts will be varied to suit the complementary portions of mounting regions 3 on display objects 2.

The plant container and mounting device illustrated in FIG. 1 can be moulded from plastics using a thermo forming process, which can result in significant cost savings over an injection moulding process.

The display objects can be made from any suitable material or combination of material. Reasonably stiff plastic sheeting is one preferred type of material, at least for the mounting regions of the display objects.

It is to be understood that various alterations, additions and/or modifications may be made to the parts previously described without departing from the ambit of the invention.

What is claimed is:

1. A display mounting device for holding a display object which has a mounting region of a certain width with at least one mounting edge, the display mounting device having:

an opening, into which the mounting region may be inserted;

a resilient placement member, which bends to allow enlargement of the opening as the mounting region is inserted into the opening, and returns to or towards its normal orientation when the mounting region has been fully inserted, thereby assisting in holding the display object in position;

at least on stabilising member to assist in holding the display object in position; and at least one retaining member, co-operable with the mounting edge to inhibit withdrawal of the mounting region from the opening, thereby assisting in holding the display object in position.

2. A display mounting device according to claim 1 wherein the opening has a length including a wide portion and a narrow portion wherein the wide portion is capable of accommodating the width of the mounting portion while the narrow portion is not normally capable of accommodating the width of the mounting region.

3. A display device according to claim 1 wherein the resilient placement member is oriented substantially perpendicular to the direction of insertion of the mounting region into the opening, and bends in the direction of insertion during insertion of the mounting region into the opening, and after the insertion has been completed it returns to an orientation substantially perpendicular to the mounting region.

4. A display device according to claim 1 wherein the resilient placement member comprises a substantially flat membrane held in place by substantially rigid supports, with an edge of the membrane forming one side of the opening.

5. A display device according to claim 1 wherein the retaining member includes at least one step behind which the mounting edge locates to prevent withdrawal of the mounting region from the opening.

6. A display device according to claim 1 further including stabilising formations to hold the display object in a stable manner.

7. A display object in combination with a display mounting device, the display object having:
- a display region;
- a mounting region; and
- a mounting edge in the mounting region;

and the display mounting device having:
- an opening, into which the mounting region may be inserted,
- a resilient placement member, which bends to allow enlargement of the opening as the mounting region is inserted into the opening, and returns to or towards its normal orientation when the mounting region has been fully inserted, thereby assisting in holding the display object in position;
- at least one stabilising member to assist in holding the display object in position; and
- at least one retaining member, co-operating with the mounting edge to inhibit withdrawal of the mounting region from the opening, thereby assisting in holding the display object in position.

8. A combination according to claim 7 wherein the display object is selected from the group consisting of a label, a packet of seeds, a packet of fertiliser, a sample packet and a combination of these.

9. A combination according to claim 7 wherein the opening of the display mounting device includes a portion wide enough to accommodate the thickness of the mounting region, and a narrower portion which is not normally wide enough to accommodate the thickness of the mounting region.

10. A combination according to claim 7 wherein the resilient placement member of the display mounting device is oriented substantially perpendicular to the direction of insertion of the mounting region into the opening, and bends in the direction of insertion during insertion of the mounting region into the opening, and after the insertion has been completed it returns to an orientation substantially perpendicular to the mounting region.

11. A combination according to claim 7 wherein the resilient placement member of the display mounting device comprises a substantially flat membrane held in place by substantially rigid supports, with an edge of the membrane forming one side of the opening.

12. A combination according to claim 7 wherein the retaining member of the display mounting device included at least one stop behind which the mounting edge locates to present withdrawal of the mounting region from the opening.

13. A combination according to claim 7 wherein the display mounting device further includes stabilising formation to hold the display object in a stable manner.

\* \* \* \* \*